(12) United States Patent
Arora et al.

(10) Patent No.: US 10,614,422 B2
(45) Date of Patent: Apr. 7, 2020

(54) METHOD AND SYSTEM FOR COMMUNICATION CONTENT MANAGEMENT

(71) Applicant: INTERNATIONAL BUSINESS MACHINES CORPORATION, Armonk, NY (US)

(72) Inventors: Deepak Arora, Kolkata (IN); Diptiman Dasgupta, Kolkata (IN); Hema Chandra Babu Kolla, Andhra Pradesh (IN); Anindya Mitra, Kolkata (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/651,632

(22) Filed: Jul. 17, 2017

(65) Prior Publication Data
US 2019/0019155 A1  Jan. 17, 2019

(51) Int. Cl.
*G06Q 10/10* (2012.01)
*H04L 12/58* (2006.01)

(52) U.S. Cl.
CPC ........... *G06Q 10/107* (2013.01); *H04L 51/20* (2013.01); *H04L 51/34* (2013.01); *H04L 51/22* (2013.01); *H04L 51/30* (2013.01)

(58) Field of Classification Search
CPC ..... H04L 67/10; H04L 67/28; H04L 67/2842; H04L 67/2857; H04L 51/22; H04L 67/32; H04L 67/289; H04L 47/122; H04L 47/25; H04L 65/608; H04L 67/22; H04L 67/2885; H04L 43/10; H04L 67/26; H04L 47/2475; H04L 51/24; H04L 69/16; H04L 69/22; H04L 67/2819; H04L 67/2833;
(Continued)

(56) References Cited

U.S. PATENT DOCUMENTS 9,282,073 B1  3/2016 Avital et al.
9,438,551 B1  9/2016 Devasthali et al.
(Continued)

OTHER PUBLICATIONS

Lovejoy, Ben; Apple granted patent for way to stop iPhones from taking photos at concerts or sensitive locations; 9 to 5 Mac; URL: https://9to5mac.com/2016/06/28/apple-aptent-infra-red-block-photos; Jun. 28, 2016; 11 pages.
(Continued)

*Primary Examiner* — Djenane M Bayard
(74) *Attorney, Agent, or Firm* — Schmeiser, Olsen & Watts; Mark C. Vallone

(57) ABSTRACT

A method of dynamically changing a read status of an electronic message. A computer accesses a communication management system that manages electronic messages among members of a participating team. The computer reviews at least one electronic message transmitted to a member of the participating team and analyzes a read status of the electronic message of the member to identify an unread electronic message. The computer also tracks a location of the member of the participating team and identifies a meeting between members of the participating team based on the location. The computer will update the read status if members of the participating team discuss content of the unread electronic message during the meeting.

15 Claims, 9 Drawing Sheets

(58) Field of Classification Search
CPC ... H04L 67/325; H04L 67/42; H04L 67/1097; H04L 12/12; H04L 47/283; H04L 47/803; H04L 51/043; H04L 61/1511; H04L 65/1066; H04L 67/02; H04L 67/24; H04L 67/2852; H04L 69/26; H04L 43/0882; H04L 47/12; H04L 47/22; H04L 51/32; H04L 51/36; H04L 5/0053; H04L 67/04; H04L 67/2876; H04L 69/04
See application file for complete search history.

(56) References Cited

U.S. PATENT DOCUMENTS

| | | | |
|---|---|---|---|
| 2002/0013781 A1* | 1/2002 | Petersen | G06Q 30/02 |
| 2004/0064322 A1 | 4/2004 | Georgiopoulos et al. | |
| 2008/0005249 A1 | 1/2008 | Hart | |
| 2011/0183645 A1* | 7/2011 | Chawla | H04M 3/42357 |
| | | | 455/410 |
| 2012/0089688 A1* | 4/2012 | Harpur | G06Q 10/107 |
| | | | 709/206 |
| 2014/0059141 A1 | 2/2014 | Belkin et al. | |
| 2018/0097841 A1* | 4/2018 | Stolarz | H04L 67/306 |
| 2019/0005978 A1* | 1/2019 | Barnett | G10L 21/10 |

OTHER PUBLICATIONS

Wikipedia; Topic model; URL: https://en.wikipedia.org/wiki/Topic_model; retrieved from the Internet Jan. 16, 2017; 3 pages.

Malerhofer, Georg; How to build a topic-based search engine; URL: http://www.smithinst.co.uk/blog/how-to-build-a-topic-based-search-engine/; retrieved from the Internet Jan. 16, 2017; 3 pages.

Bingham, Ella et al.; Finding topics in dynamical text: application to chat line discussions; 10th International World Wide Web Conference; May 1-5, 2001; 2 pages.

Buntine, Wray et al.; A Scalable Topic-Based Open source Search Engine; IEEE/WIC/ACM international Conference on Web Intelligence; Sep. 20-24, 2004; 7 pages.

Baghdadi, Hossein Shshsavand et al.; An Automatic Topic Identification Algorithm; Journal of Computer Science 7 (9); Jan. 2011; pp. 1363-1367.

Rubin, Jamie Todd; Going Paperless: Automating the Creation of Meeting Minutes using IFTTT and Evernote; Sep. 11, 2012; URL: http://www.jamierubin.net/2012/09/11/going-paperless-automating-the-creation-of-meeting--minutesusing-ftttt-and-evernote/; 6 pages.

COGI; Create accurate meeting minutes by capturing the details; URL: https://legacy.cogi.com/create-accurate-meeting-minutes; retrieved from the Internet Jan. 16, 2017; 3 pages.

Lebowitz, Shana; What your email inbox reveals about your personality; Apr. 23, 2015; URL: http://www.businessinsider.in/What-your-email-inbox-reveals-about-your-personality/articleshow/47029764.cms; 16 pages.

Flynn, Pat; SPI 115: 9000 Unread Emails to Inbox Zero: My Executive Assistant Shares How We Did It (and How You can Too!); Jun. 28, 2014; URL: http://www.smartpassiveincome.com/podcasts/email-management/; 5 pages.

TALIRAPPS; myTranslator.io: Voice and Text Translator; URL: https://itunes.apple.com/us/app/mytranslator.io-real-time/id979573072?mt=8; Retrieved from the Internet Jan. 16, 2017; 2 pages.

Russell, Jon; Google Translate Now Does Real-Time Voice and Sign Translations On Mobile; Jan. 14, 2015; URL: http://techcrunch.com/2015/01/14/amaaaaaazing/; 7 pages.

Noopuran, Sivaguru et al.; Exclusive: Proximity Sensing in Mobile Phones; Jan. 31, 2014; URL: http://www.wirelessdesignmag.com/article/2014/01/exclusive-proximity-sensing-mobile-phones; 6 pages.

Bonnie, Emily; Email Management: 10 Clever Tricks to Hit Inbox Zero; Feb. 15, 2015; URL: https://www.wrike.com/blog/inbox-zero/; 9 pages.

Kurtus, Ron; Detecting Sound Waves; revised Dec. 1, 2009; URL: http://www.school-for-champions.com/science/sound_detection_htm#.V0FEiEZUAsY; 4 pages.

Zissman, Marc A.; Automatic Language Identification of Telephone Speech; The Lincoln Laboratory Journal, vol. 8, No. 2; 1995; pp. 115-144.

Amine, Abdelmalek et al.; Automatic Language Identification: An Alternative Unsupervised Approach Using a New Hybrid Algorithm; International Journal of Computer Science and Applications, vol. 7, No. 1; 2010; pp. 94-107.

* cited by examiner

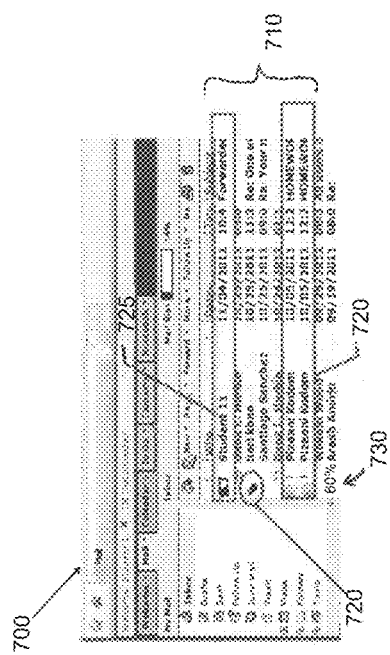
FIG. 7
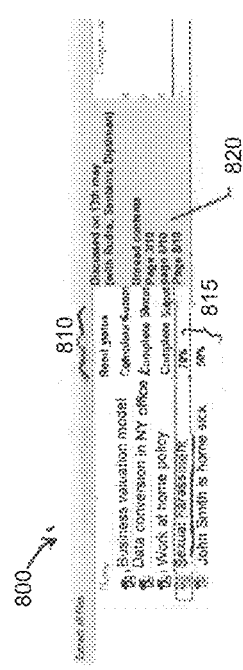
FIG. 8
FIG. 9

METHOD AND SYSTEM FOR COMMUNICATION CONTENT MANAGEMENT

TECHNICAL FIELD

The present disclosure relates to e-mail systems in general, and to enhancing e-mail performance within an organization.

BACKGROUND

Electronic mail, commonly referred to as email, e-mail or simply mail is a method of exchanging digital messages from an author to one or more recipients.

Current mail systems are mostly client-server based. A mail server is an application that receives e-mail messages from e-mail clients, or from other mail servers. A mail server usually comprises a list of users, a storage area, a set of user definable rules, and a series of communication modules. The storage area is where received mail messages are stored for local users, and where messages in transit to another destination are temporarily stored. The storage area usually takes the form of a database of information. The user defined rules determine how the mail server should react when determining the destination of a specific message, or possibly react to the sender of the message. For example: specific e-mail addresses can be barred, or certain users can be restricted to only sending messages within the company. The list of users is a database of user accounts that the mail server recognizes and will deal with locally, and the communications modules are components that actually handle the transfer of messages to and from other mail servers and e-mail clients. Depending upon the requirements of the mail server, a number of different modules may be installed and used by the server.

A mail client is an application, used by users for reading, writing, sending and receiving e-mail messages. A mail client may be installed on a user's computing platform, but may additionally or alternatively be implemented as a web page accessed for example using a browser. The client usually comprises an editor, an address book, a folder collection or hierarchy in which messages may be stored, and communications modules. The address book allows users to store commonly used e-mail addresses in an easy to get at format, reducing the chance of addressing errors.

A mail system implemented within an organization usually consists of one or more mail servers, each connected to a multiplicity of clients, each client associated with a user or another entity within the organization, such as an employee, a group of employees, a resource such as a room, or the like.

In normal operation mode, a client composes a mail message addressed to one or more addressees. One or more of the addressees may be from the same organization, i.e., connected to the same mail server, or one or more addressees may be external to the organization. After composing the mail, the mail is being sent and distributed by the mail server to the internal addressees, if any, or to one or more external mail servers for distribution to the external addressees, if any.

Also in normal operation mode, a client receives e-mail messages from users within the organization or external to the organization. The user may view the received or sent email, and may order the email in accordance with predetermined parameters, such as receipt date and time, sender, subject, or the like. Some email are person specific (e.g., one-to-one email) and some content is targeted to many recipients. Frequently, many email and/or web pages are not read by all of the recipients.

SUMMARY

A method and system for dynamically changing a read status of an electronic message is provided. A computer accesses a communication management system that manages electronic messages among members of a participating team. The computer reviews at least one electronic message transmitted to a member of the participating team and analyzes a read status of the electronic message of the member to identify an unread electronic message. The computer also tracks a location of the member of the participating team and identifies a meeting between members of the participating team based on the location. The computer will update the read status if members of the participating team discuss content of the unread electronic message during the meeting.

In accordance with an embodiment of the invention, the computer may further analyze first content of the electronic message and receives data related to second content of an oral communication between the members of the participating team during the meeting. The computer compares the first content of the electronic message with data related to the second content of the oral communication, and the computer provides notice to the member including an evaluation of common content between the first content of the electronic message and the data related to the second content of the oral communication.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 7 illustrates a dashboard arrangement showing the e-mail notification system according to an embodiment of the present invention.

FIG. 8 illustrates a dashboard providing an exemplary arrangement for identifying group member of a participating team and relevant discussions held by the group members.

FIG. 9 is a data table or dashboard illustrating some features of the notification process in accordance with an embodiment of the present invention.

DETAILED DESCRIPTION

Figure 1:
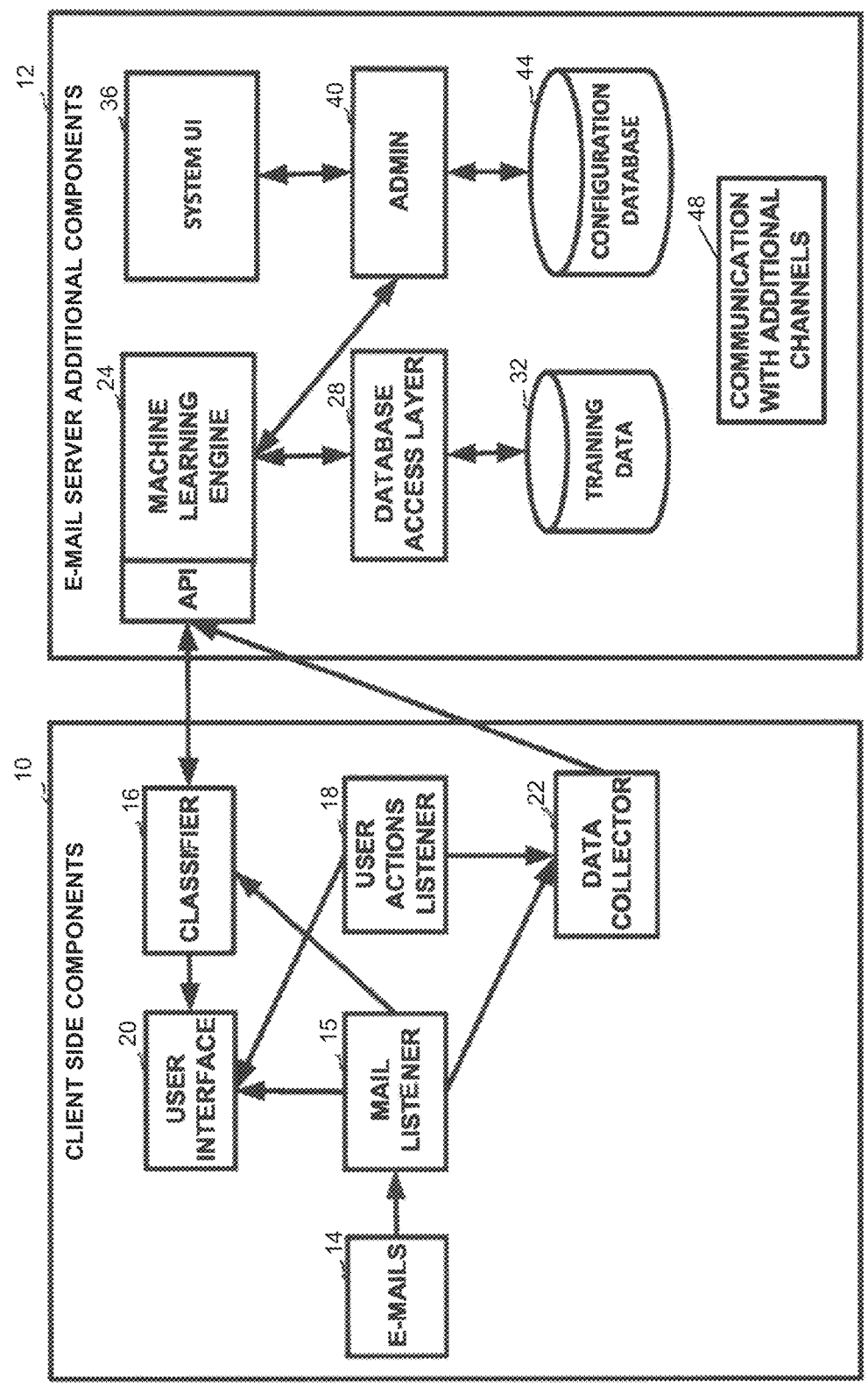
FIG. 1 illustrates a schematic block diagram of a system for e-mail or other communication enhancement within an organization, in accordance an embodiment of the present invention.

According to the invention, if any user or member has multiple unread email messages then topic of conversation may be suggested to the member or the member might be recommended to join in a group where there is a chance of discussing one or more unread content of the unread email. Various parameters are considered to recommend group to be joined to clear unread email messages and related documents. Thus, the content of an unread email may be discussed in person with other recipients to save time and redundancy. In accordance with this invention, the system will be able to review and reconcile the status and content of unread email with the content of related breaks, meetings, conference calls and discussions.

Further according to the invention, formal and informal discussion content is captured from various participating members and accordingly, based on contextual analysis of the discussion content, unread email contents will be compared and analyzed. The discussion contents may be in different languages and software may aggregate the gathered data and may translate the content with a common language. The invention will also identify if any unread email is covered during the discussion.

An appropriate dashboard icon may be associated with email messages documents and may report percentage of coverage of email and related documents during the discussion. When the user opens the partially covered email, the user may want to view the only content that is not covered in any related discussion. The present invention will identify that already has been reviewed and discussed. Thus, the present invention provides a mechanism to dynamically update and change in real time a dashboard with the read status of various electronic messages. The tracking of related conversations is received in real time and compared to existing electronic messages to improve human efficiency in the home and work environments. The present invention further provides a significant improvement in computer technology by expanding and enhancing the existing status indicators for various electronic messages. Present technology is limited in its ability to notify users beyond basic read and unread e-mail content, while the present invention provides a dynamic analysis of email content versus oral communications by members of a group who interact on a regular basis, thus saving valuable time and effort for all persons involved. The dynamic nature of the present invention not only saves time and money for users and employers but it further provides a mechanism to suggest topics for future conversations among members of the participating team by identifying topics that have not been reviewed and/or discussed by members of the team.

In the description below, the terms "mail", "e-mail", "email", "message" or similar terms are used interchangeably and are not limited to a specific protocol. Exemplary protocols for transmitting such messages may include Simple Mail Transfer Protocol (SMTP), Post Office Protocol (POP3), Internet Message Access Protocol (IMAP), Short Message Service (SMS) or the like. Such terms generally relate to an electronic communication that may be transmitted by an author to one or more intended recipients and may be consequently received by devices of such recipients.

One technical problem dealt with by the disclosed subject matter is the limited control e-mail users have over the incoming mail messages received. Incoming mails are usually sorted in accordance with one of a few predetermined and technical parameters, such as receiving time, sender, subject, or the like. However, conventional sort techniques seldom reflect the real importance and priority of a mail message to the receiver. Such importance may often be affected by factors such as the message content; other recipients of the message; what one or more of the other recipients did with the message, for example replied, forwarded the message, deleted the message, or the like; the length of the message; the urgency of the message which may also be affected by other people's activities, or the like. In addition, the priority of each incoming message to a receiving user may depend on the state of the receiving user.

Workers in an office, from time to time, take breaks for tea, cigarettes, lunch, etc. in a group. During the break time, the workers often discuss various topics. Some of the discussion topics are related to the transmitted and received communications (e.g., email) to a group of employees. In this scenario, there exists an opportunity to integrate unread content into discussion content during break time, meeting time, conferences calls, and the like. Accordingly, it would be beneficial to change the status of unread message content because the content was discussed during the break or while the employees were congregating in a group such as during a meeting or informal gathering. As the unread content has already been discussed by the recipient, there may be no need for the same recipient to read further. This type of tracking and notification will save time for each employee. For example, while leaving for tea break, one user (User M) has 4 unread email messages. The other participating group members have already read the four unread email messages before going for break. Now, during the break time, the participating team may have discussed those topic presented in the "unread" email. After the break, User M will find that the 4 unread email messages are flagged as read because these were topics of discussion during the break. The specific process for reconciling the unread email content with the topics of discussion during User M's break will be discussed below.

In accordance with this invention, various methods, systems and programs are utilized to more efficiently manage the status of read and unread messages and content within a group environment.

FIG. 1 illustrates a schematic block diagram of a system for e-mail or other communication enhancement within an organization, in accordance an embodiment of the present invention. Referring now to FIG. 1, the system generally comprises client side components 10 and e-mail server additional components 12. In some embodiments, e-mail server additional components 12 receive information related to activities of a multiplicity of users within an organization. Based on these activities the system may change the manner at which a user sends messages to other users, or may assign a priority to one or more messages received by the user.

Client side components 10 may be implemented as a plugin added to a communication client such as an e-mail client, as part of a specific communication client, as a separate executable, or the like. It will be appreciated that client side components 10 are not limited to e-mails and may be incorporated into a client program of any communication channel.

Client side components 10 may comprise user interface 20, for displaying to a user the regular communication options, as well as additional features, such as messages sorted in accordance with dynamic priorities, receiving suggestions to send messages in alternative times or manners, or the like. In some exemplary embodiments, user interface 20 may be responsive to user selection indicating her availability status, such as "on the run", "inbox cleanup", "important only", or the like, and may prioritize or hide/display messages accordingly.

Client side components 10 may receive communication messages 14 such as e-mails, which may be received by mail listener 15. Client side components 10 may also include user actions listener 18, which may monitor for actions by the user, such as composing messages, attending in-person meetings, attending meetings scheduled in an electronic calendar, looking for people, replying to messages, or the like. Information from message listener 15 and user actions listener 18 may be provided to user interface 20 and reflected in a display.

The information may also be provided to data collector 22 that collects the data and may transmit the data to the server additional components 12.

Server additional components 12 may be implemented as additions to an e-mail server or another communication server, as a separate program or application, or the like.

Server additional components 12 may comprise machine learning engine 24, having an Application Program Interface (API), for receiving information collected from one or more client systems and providing responses to queries by the client systems.

Server additional components 12 may comprise database access layer 28 connecting to database 32, database 32 comprising for example models and training data upon which models are determined.

Server additional components 12 may also comprise system user interface 36 for providing to a user such as a system administrator, content specialist, or others, information about the gathered communication messages, the volume of messages processed, the formed connections, the models, or the like. Server additional components 12 may further comprise administration component 40 for managing users, activities, or the like, and configuration database 44 for storing and retrieving user configurations, matching configurations, or the like. Server additional components 12 may further comprise communication with additional channels component 48 for receiving information related to users' activities in various communication systems such as instant messaging, text messaging, social networks or the like.

Classifier 16 of client side components 10 may address machine learning engine 24 for receiving a score to be associated with a mail message, which score may take into account activities of other users within the organization as related to the message, and as detailed above, and may be used for displaying the user's messages according to their priorities. In some alternative embodiments, machine learning engine 24 may provide classifier 16 with a predictor, such as a formula determining priority of message. Incoming mails or composed mails may be analyzed by performing optical character recognition (OCR), by extracting terms, and the formula may be applied to the terms or to meta data of the mails to obtain a priority score, upon which the mail is displayed among other mails. In some exemplary embodiments, machine learning engine 24 may determine the model and provide the model to classifier 16 to be applied. Additionally or alternatively, classifier 16 may implement internally a machine learning engine instead of or in addition to addressing machine learning engine 24. In some exemplary embodiments, the disclosed subject matter may implement supervised learning or unsupervised learning. The OCR capabilities will play an important role in the review, management and reconciliation of email content with meeting content as will be described in more detail below.

In some exemplary embodiments, data collector 22 may provide information related to the user's activities to machine learning engine 24 for further updating scores of messages of one or more other users based on the activity of the user. Likewise, the data collector 22 may store the content of email messages for later use.

It will be appreciated that machine learning engine 24 may comprise further components, for example a component for scanning and providing OCR for messages of multiple users and trying to find common subjects and topics in common with meetings, as described below, and further API functions which one or more clients may address.

The machine learning engine 24 interacts with the database access layer 28 to compare the subject matter of various e-mails or other electronic messages to the subject matter of oral communications between team members. The system 100 will be programmed to identify common topics among these various communication messages by utilizing word watching, synonyms, dictionaries and an historical database to identify terms and phrases that relate to and define common topics. For a particular institution or industry, the database may be built to match the terms and phrases that are popular for that field of endeavor. Moreover, user may proactively correlate certain terms, phrases and topics to enhance the topic matching abilities of the system 100 of FIG. 3. Artificial intelligence techniques currently have the ability to correlate different communications based on the content of those communications based on different statistical analyses and tree-like structures for relating terms and phrases. Other techniques of correlating different forms of communication such as electronic messages and recordings of oral communications will be apparent to those of skill in the art.

As described herein, the machine learning engine 24 may further match the text of messages to transcripts of meeting and/or conference calls occurring between multiple users. In accordance with the invention, the transcript of meeting is intended to encompass a wide range of interactions between the multiple users of the system of this invention.

Figure 2:
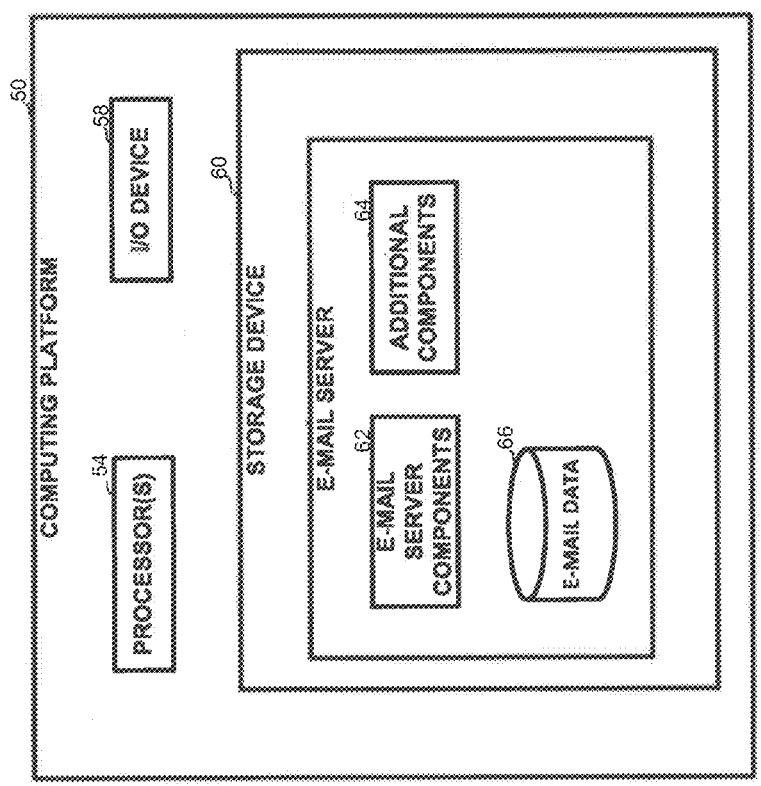
FIG. 2 illustrates a schematic block diagram of a computing platform executing a mail server, in accordance with an embodiment of the present invention.

FIG. 2 illustrates a schematic block diagram of a computing platform executing a mail server, in accordance with an embodiment of the present invention. Referring now to FIG. 2, those of skill in the art will appreciate that the disclosure is not limited to a mail server and may also be applied to other communication servers. In some exemplary embodiments, the apparatus may be implemented as computing platform 50 such as a server, a desktop computer, a mobile computer, or the like. As set forth below, cloud computing is envisioned with the present invention.

Computing platform 50 may comprise one or more processor(s) 54. Processor 54 may be a Central Processing Unit (CPU), a microprocessor, an electronic circuit, an Integrated Circuit (IC) or the like. Processor 54 may be utilized to perform computations required by the apparatus 100 described below or any subcomponents.

In some exemplary embodiments of the disclosed subject matter, computing platform 50 may comprise an Input/Output (I/O) device 58 such as a display, a pointing device, a keyboard, a touch screen, or the like. I/O device 58 may be utilized to provide output to and receive input from a user.

In some exemplary embodiments, computing platform 50 may comprise a storage device 60. Storage device 60 may be a hard disk drive, a Flash disk, a Random Access Memory (RAM), a memory chip, or the like. In some exemplary embodiments, storage device 60 may retain program code operative to cause the processor 54 to perform acts associated with any of the subcomponents of computing platform 50. The components detailed below may be implemented as one or more sets of interrelated computer instructions, executed for example by processor 54 or by another processor. The components may be arranged as one or more executable files, dynamic libraries, static libraries, methods, functions, services, or the like, programmed in any programming language and under any computing environment.

Storage device 60 may store e-mail server components 62, for managing e-mail activities within an organization. E-mail server components 62 may comprise conventional e-mail server components 62, as conventionally implemented. E-mail server components 62 may further comprise e-mail data 66 and additional components 64, for providing organization-wise features such as described in association with FIGS. 5-10 below.

E-mail server components 62 may further store or be in communication with e-mail database 66, storing e-mails and results for further processing as described.

Figure 3:
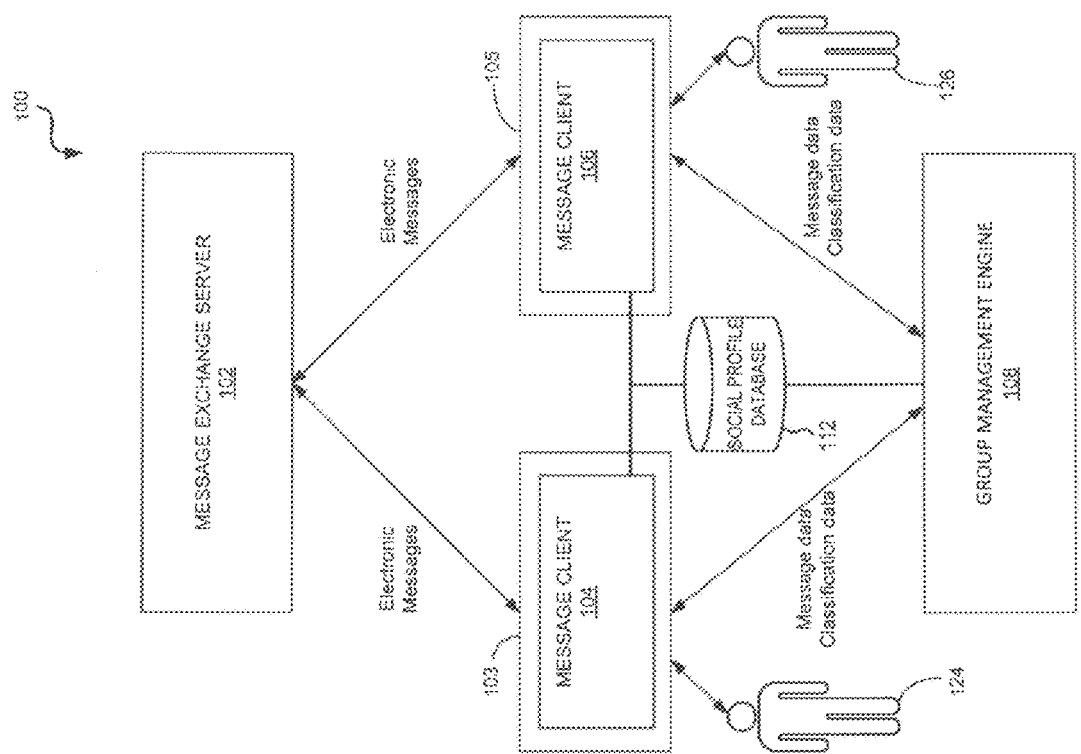
FIG. 3 is a block diagram illustrating various components of an electronic messaging system for organizing electronic messages based on a group management engine according to an embodiment of the present invention.

FIG. 3 is a block diagram illustrating various components of an electronic messaging system 100 for organizing electronic messages based on a group management engine according to an embodiment of the present invention. As shown in FIG. 3, the electronic messaging system 100 includes a message exchange server 102, users 124, 126, client devices 103, 105, and a group management engine 108. As is understood by skilled artisans in the relevant computer and Internet-related arts, each component, module, or engine shown in the figures described herein represents a set of executable software instructions and the corresponding hardware (e.g. memory and processor) for executing the instructions. To avoid obscuring the inventive subject matter with unnecessary detail, various functional components, modules, and engines that are not germane to conveying an understanding of the inventive subject matter have been omitted from the figures described herein. However, a skilled artisan will readily recognize that various additional functional components, modules, and engines may be used with an electronic messaging system, such as that illustrated in FIG. 3, to facilitate additional functionality that is not specifically described herein. Furthermore, the various functional components, modules, and engines depicted in FIG. 3 may reside on a single server computer, may be distributed across several server computers in various arrangements or may reside on a cloud computing system. The cloud computing components will be described below with reference to FIGS. 11-12.

The message exchange server 102 may be a network addressable server computer configured to transmit electronic messages (e.g., email) from a sender to one or more recipients. In particular, FIG. 3 shows that the message exchange server 102 communicates electronic messages between the client devices 103, 105 operated by users 124, 126, respectively. Consistent with various embodiments, the message exchange server 102 and the client devices 103, 105 may include logic to send and receive data according to Hypertext Transport Protocol (HTTP), Internet Message Access Protocol (IMAP), Post Office Protocol (POP), Simple Mail Access Protocol (SMAP), and other web-based, application programming interface (API) messages. In some embodiments, the message exchange server 102 may include application logic, which, in conjunction with the client devices 103, 105, generates various user interfaces (e.g., web pages) with data retrieved from various data sources.

The client devices 103, 105 may be computer devices such as laptops, mobile phones, desktops and the like. The client devices 103, 104 may operate messaging clients 104, 106, respectively. The messaging clients 104, 106 may include logic that, when executed by one or more processors, sends, receives, displays, or otherwise operates on electronic messages. A web browser or an OUTLOOK® client, as provided by MICROSOFT®, are examples of messaging clients within the contemplation of this disclosure. Accordingly, the messaging client 106 may send an electronic message to messaging client 104 through the message exchange server 102.

According to some embodiments, the messaging clients 104, 106 may be configured further to communicate with the group management engine 108. The group management engine 108 may be a network addressable computer device that includes logic for providing functionality associated with maintaining and accessing group messages. For example, the group management engine 108 may receive user interaction updates as the messaging clients 104, 106 interact (e.g. send, receive, tag, and the like) with electronic messages. User interaction updates, as described above, may include member profile data, message data, and interaction data.

Consistent with embodiments described herein, the group management engine 108 may utilize a number of classifiers, such as rule-based classifiers, decision tree-based classifiers, neural network classifiers, support vector machine classifiers, and Bayesian classifiers. Maintaining such classifiers may involve updates probability models based on statistical learning from past interactions of other users or groups of users.

In addition to receiving user interaction updates, the group management engine 108 may also communicate group notifications to the message clients 104, 106. As described above, a group notification rule may include any suitable data, derived from user interactions from a group of users that are usable to organize or otherwise prioritize a set of electronic messages.

The messaging clients 104, 106 and the group management engine 108 may be communicatively coupled to a social profile database 112. The social profile database 112 may store member profiles associated with the users 124, 126 of the messaging clients 104, 106. In some embodiments, the member profiles are part of a social or business network service. The member profiles may include classification attributes associated with the users of the messaging clients. Consistent with embodiments described herein, a user's age, gender, interests, contact information, home town, address, co-workers, supervisors, subordinates, the name of the member's spouse and/or family members, and so forth are examples of classification attributes. With other embodiments, such as some business networking services, a member profile may include classification attributes related to a professional resume or curriculum vitae, such as classification attributes relating to a person's education, employment history, skills, professional organizations, hobbies, and so on. In some embodiments, a member profile may be viewable to the public by default, or alternatively, the member profile may designate some portion of the member profile is to be public by default.

The users 124, 126 may interact with the messaging clients 104, 106 to generate, receive, transmit, or otherwise access electronic messages through the message exchange server 102. Further, the users 124, 126 may interact with the messaging clients 104, 106 to receive or otherwise access the social classification rules maintained by the classification rule engine 108 and to transmit user interaction updates to the classification rule engine 108.

It is to be appreciated that FIG. 3 merely illustrates one example embodiment of a system that organizes electronic messages based on classification rules and that other embodiments are within the contemplation of the present disclosure. For example, it should be appreciated that the classification rule engine 108, although displayed as a separate component, may be a plug-in deployed within the messaging client 104 or the message exchange server 102. Further, the message exchange server 102 may be configured to communicate with the classification rule engine 108 in response to receiving the electronic messages and communication from the message clients 104, 106.

Figure 4:
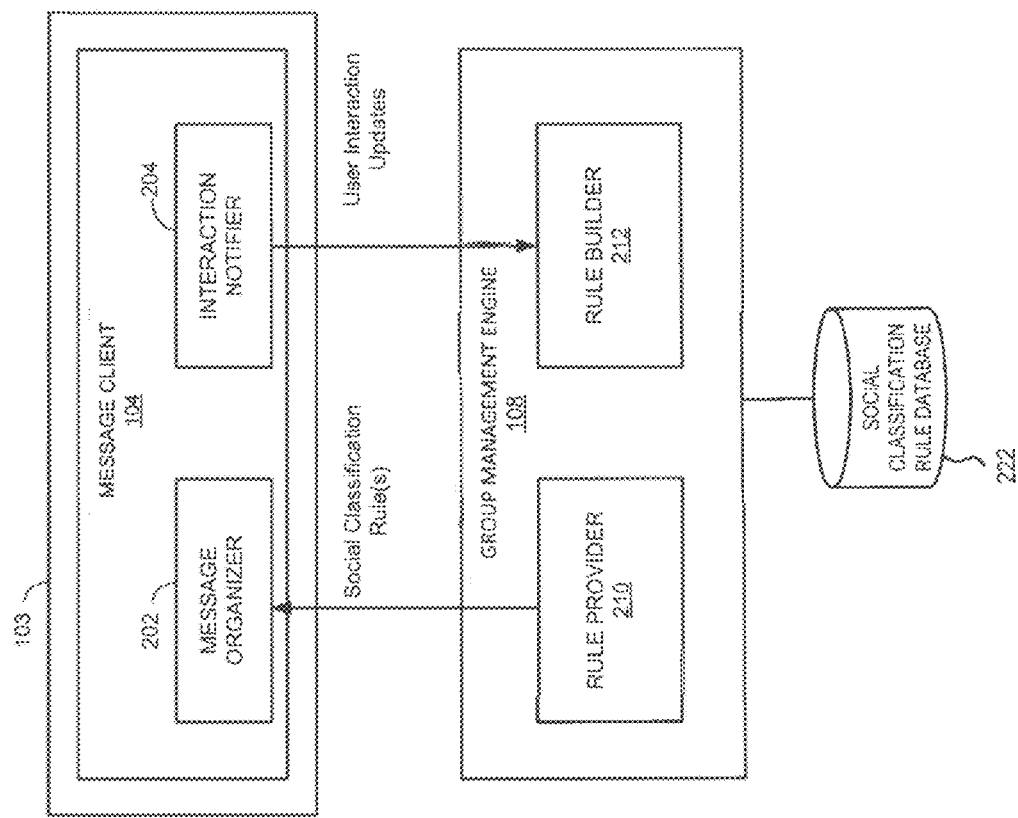
FIG. 4 is a block diagram illustrating some of the functional components or modules that comprise the messaging client and classification rule engine according to an embodiment of the present invention.

FIG. 4 is a block diagram illustrating some of the functional components or modules that comprise the messaging client and classification rule engine according to an embodiment of the present invention. To simplify discussion of example embodiments disclosed herewith, FIG. 4 does not show messaging client 106 (see FIG. 3). However, it is to be appreciated that messaging client 106 may also include the modules and functionality discussed with respect to the messaging client 104.

FIG. 4 shows that the messaging client 104 includes a message organizer module 202 and an interaction notifier module 204. The message organizer module 202 may include logic and data used to receive one or more social classification rules from the group management engine 108. Using the one or more social classification rules, the message organizer module 202 may then organize one or more electronic messages according to historical user interactions performed by a group of users. In some cases, the message organizer module 202 may organize the one or more electronic messages by ranking the electronic messages according to a relevancy score calculated as a function of a social classification rule (or social classification rules) and an electronic message. In other cases, the message organizer module 202 may organize the one or more electronic messages by tagging electronic messages based on a comparison between a relevancy score and a threshold based matching the text of the message with a transcript of a relevant discussion by members of the social network as described below.

The interaction notifier module 204 may include logic and data used to send user interaction updates to the classification rule engine 108. As is described in greater detail below, the group management engine 108 may use the user interaction updates associated with one or more users to build up or update a social classification rule. As previously mentioned, user interaction updates may include data relating to member profile data (a member profile identifier, classification attributes, etc.), message data (keywords, header information, etc.), and interaction data (e.g., replying, accessing, deleting, tagging, etc.).

Additionally, FIG. 4 shows that the group management engine or classification rule engine 108 includes a rule provider module 210 and a rule builder module 212. The rule provider module 210 may provide social classification rules to a message client. In some embodiments, the rule provider module 210 accesses a social classification rule database 222 to identify one or more social classification rules that are associated with a user. Consistent with embodiments described herein, the social classification rule database 222 may index the social classification rules on a classification attribute. Accordingly, upon a request from the message organizer 202, the rule provider 210 may return a social classification rule corresponding to classification attributes associated with a user. In some embodiments, the classification attributes may be explicitly indicated by the message organizer 202. In other embodiments, the rule provider 210 may access the social profile database 112 (see FIG. 3) to identify one or more classification attributes that are associated with a given user. The term "social" is intended to encompass a wide range of interactive groups including co-workers, business associates, social media groups, etc.

The rule builder module 212 may include logic to build or update one or more social classification rules, as may be stored in the classification rule database 222. For example, using member profile data received in a user interaction update sent by the interaction notifier module 204, the rule builder module 212 updates a social classification rule associated with a classification attribute associated with the member profile data. In some cases, the member profile data includes classification attributes that are to be used to identify the social classification rule that is to be updated. In other cases, the member profile data sent in the user interaction update is a member profile identifier that can be used to access a member profile stored in the social profile database 112. The member profile accessed in this way can then be used to obtain one or more classification attributes associated with the user.

It should be understood that the phrase "social classification" is intended to broadly describe the group interaction of the users which may include social networks, professional networks, educational networks, etc. Thus, the social classification is intended to include co-workers organized according to an appropriate corporate or work-environment structure. The social classification may include a group of co-workers assigned to specific project or department within a corporate environment so that their messages may be organized and directed to the appropriate channels as described herein.

In accordance with this invention, the system 100 is provided with a method and system for unread communication content management for a wide variety of groups, work environments, and social networks. The terms "employee" or "member" or "user" are intended to be used interchangeable as applied to the present invention, and the group of persons utilizing the group management engine are usually part of an organization and may be referred to as a "participating team" when discussing this invention.

According to the invention, the email messages of each participating member of a team is monitored and recorded, and the location of each member is likewise monitored and recorded. Additionally, the history of the member is tracked and recorded to the extent that the history of the member's breaks, meetings and associates is known to the system. The system monitors the content of each member's email messages and tracks the email content with the content of meetings and discussion held between members of the participating team. If any user has multiple unread email messages then the user might be recommended to join in a group where there is a chance of discussing one or more unread content of the unread email. Various parameters are considered to recommend group to be joined to clear unread email messages and related documents. Alternatively, the content of an unread email may be discussed in person with other recipients. In this case, the invention will be able to review and reconcile the content of unread email with the content of related meetings, conference calls and discussions.

Further according to the invention, formal and informal discussion content is captured from various participating users and accordingly based on contextual analysis of the discussion content, unread email contents such documents will be mapped. The discussion contents can be in different languages and software aggregate the gathered data and will translate the same with the common language as mentioned in the communication and identifying if any unread email is covered during the discussion.

The present invention not only monitors current activity of participating members but may predict future break times. For example, a member A takes a break; e.g., tea break, cigarette break, lunch, coffee break, etc. The computing system will predict other possible members of the participating team who might be accompanied by member A user during the break time based on an historical database of activity for the relevant members of the participating team. The system will have the capability to compare the content of the discussions during member A's break to unread email messages for each member of the participating team. Similarly, the system may recommend topics of discussion for the members during the same break, where the recommended topics are chosen based on the content of unread email messages for the members attending the break in question.

More specifically, based on identified knowledge level of each predicted participants against various received content, the computing system may create a list of discussion topics during the break time for the identified group in such a way that the system will recognize and identify (1) when unread content for at least one member is discussed. In this way, the member A does not have to reread those contents; (2) a maximum number of common unread topic can be discussed where at least one member is available to explain the communication; (3) the knowledge level of the member who is going to explain the topic; e.g., if the member has just scrolled through the page, then the member may not be in a position to explain the topic; and (4) articulation capacity of the user who is going to explain the topic. If the member read the content but the member articulation power is not up to the mark, then the member may not be able to explain the topic to the rest of the participating team and the system will have a provision to recognize this fact and act to assure that a proper communicator is involved in the distribution of information.

Based on various unread communication as detected by the system, member A might get an invitation or recommendation to join in a group which is expected to discuss one or more unread contents for the email inbox of member A, so that the content of many unread email messages may be covered during the discussion in the break time.

To achieve the objectives of the present invention, a microphone may be installed in a mobile device or smartwatch of member A. The installed microphone may be employed to gather the spoken discussed topic from various participating members of the participating team on break and, accordingly, the system will perform contextual analysis against the unread content of member A's email inbox to determine whether the unread content of member A's unread email inbox is discussed during the break time.

A notice component of the invention may include dashboard icons on member A's status board. In this instance, the computing system will automatically mark the unread communication with appropriate status. Specific dashboard icons may be displayed against each individual's communication content. The dashboard icons can be: summary, completely covered, partially covered, not covered, etc.

If any communication is partially covered, then the member can find the uncovered contents upon opening the communication content. The computer will mark the status of documents in the folder explorer which are already discussed. Upon selecting any file, the computing system will overlay the detail of unread status of the documents.

According to the invention, if any member has multiple unread email messages then the member might be recommended to join in a group where there is a chance of discussing one or more unread content of the unread email. Various parameters are considered to recommend groups and/or teams to be joined to clear unread email messages and related documents.

Further according to the invention, formal and informal discussion content is captured from various participating members and accordingly based on contextual analysis of the discussion content, unread email contents such documents will be mapped. The discussion contents can be in different languages and software will aggregate the gathered data and will translate the same with the common language as mentioned in the communication and identify if any unread email is covered during the discussion.

In an embodiment of the invention, an appropriate dashboard icon may be associated with email messages documents and will show percentage of coverage of email substance and related documents during the discussion. When the member opens the partially covered email, it may be possible the user may view the only content that is not covered in any related discussion. Likewise, the dashboard icon(s) may identify the member's knowledge of the subject matter, the level or degree of the member's knowledge, the members involved in the conversation, keywords related to the topic being covered by the mail, etc.

With this invention, a method is provided of managing unread communication content based on actions taken by any other recipient of the content and the discussion content is tracked among the peers. Accordingly, there is mapping of appropriate email to flag if the member knows the email content partially or completely.

While predicting break time of any member, the computing system will also predict other possible participants who might be accompanied with the member during the break time. Based on identified knowledge level of each predicted participants against various received content, the computing system will create a list of discussions topic during the break time for the identified or participating group in such a way that at least one email having unread content for at least one member is discussed. In this way, the user does not have to reread the content; instead, the member may be able to read only a part of the content or none at all. Most common unread topics may be discussed where at least one member is available to explain the communication to those who have not yet opened or read the message content. In accordance with the invention, the knowledge level of the member, who is going to explain the topic, is provided to all members. For example, if the knowledgeable member has thoroughly read and reviewed the email content, then the knowledgeable member will be in a position to fully explain the content to others. On the other hand, if the member has simply scrolled through the page, then that semi-knowledgeable member may not be in a position to explain fully the topic. These facts will be available to the participating team. Moreover, the articulation capacity of the member who is going to explain the topic may be displayed to all members; therefore, if the member read the content but the member's articulation power is not up to the mark, then the member may not be able to or asked to explain the topic. These types of decisions will likely be left to the participating team.

Based on various unread communications, a member might get a recommendation to join in a group which is expected to discuss one or more unread contents for the member, so that many unread content can be covered during the discussion in the break time.

As mentioned above, a microphone may be provided in a mobile device or smartwatch of the user, wherein the microphone will gather the spoken content from various participating members and, accordingly, will perform contextual analysis against the unread contents to find the coverage of unread content is discussed during the break time.

The computing system will automatically mark the unread communication with appropriate status. Specific dashboard icons may be displayed with respect to each individual communication with the dashboard icons noting the coverage of the communication being a summary, completely covered, partially covered, or not covered, by the participating team member. If any communication is partially covered, then member is provided with the ability to find the uncovered contents upon opening the communication content. In other words, the system will match those portions of the written communication that have already been covered through an oral communication. As a result, the participating member is provided with the capability of reviewing only those portions of a written communication that were not covered during another oral communication.

The self-learning mechanism will train the prediction model for precise identification of the participants (i.e., the participating team), predicted discussion topic and break timing. The system may employ a historical database with statistical analysis of the historical data to predict future actions of the members of the participating team. For example, a customer A has sent email to members X, Y, Z, M, N, etc. to add the member name in a web portal. Member Y has already replied the email with specific detail, and no further action is required on that email. So, the unread status of the email will be changed for each team member of the group. The computer system will mark status of documents in the folder explorer which are already discussed and, upon selecting any file, the computing system will overlay the detail of unread status of the documents including an indication of the percentage or amount of unread content exists for each specific correspondence.

Figure 5:
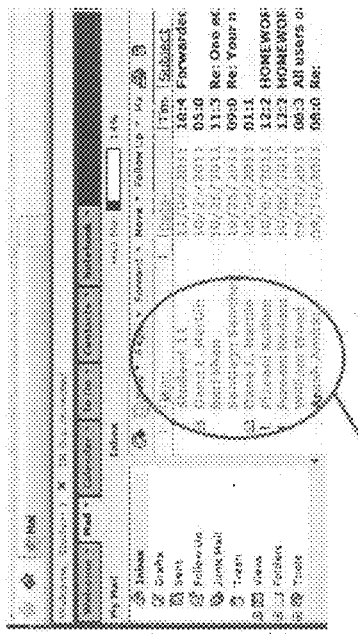
FIG. 5 illustrates in a dashboard various unread email communication content of a user according to the prior art.

FIG. 5 illustrates in a dashboard various unread email communication content of a user according to the prior art. The bold print is intended to indicate the unread nature of the email communications with other details such as date, time and subject being provided in a manner that is known in the art. As is common in the workplace, a user may have skipped or forgot or planned to address these unread email messages at a later time. As will be discussed below, the present invention provides further a variety of additional flags to notify the members of the participating team of the status of the various communications contained with the email inbox.

Figure 6:
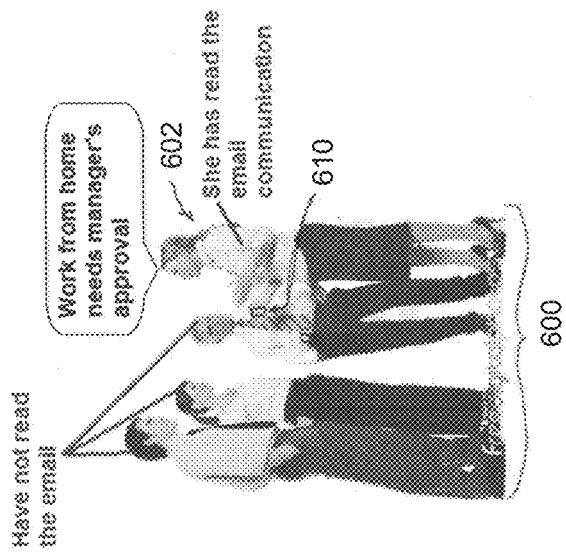
FIG. 6 illustrates a scenario where co-workers (e.g., members of a participating team) are gathered at a work site or on a break where the conversation is monitored by voice recognition according to an embodiment of the present invention.

FIG. 6 illustrates a scenario where co-workers (e.g., members of a participating team) are gathered at a work site or on a break where the conversation is monitored by voice recognition according to an embodiment of the present invention. In FIG. 6, a group of coworkers are discussing a topic of interest; e.g., the topic being the fact that work from home needs manager approval, which may have been included in a group email. This discussion can be during a break timing, informal discussion in the floor etc. In accordance with the invention, a mobile device 610 may record the spoken content which will be translated into English on real time basis. The recorded spoken content will be converted into text. Automated language identification, voice translation, and real-time conversion of spoken content to text are technologies known to those of skill in the art.

Thus, in accordance with the invention, a mobile device 610 carried by at least one member 602 of the participating team 600 may gather the spoken content of the participating team 600, and may automatically translate and/or convert the spoken content into a common language (e.g. English) and will store the same as a text file. The text conversion process will require less amount of storage space in the mobile device. Once the spoken content is received and converted to a text file, the system 100 will compare the text file with appropriate e-mail message in the message boxes of the members of the participating team. The comparison of the text file to the message in-box for the participating team is performed to identify unread content in the message inbox for each member of the participating team. After the contextual analysis is performed with the unread content of the message in-boxes, an appropriate flagging is done to notify each member of the participating team which message content in the respective message in-box contains unread content. After the comparison is completed, the stored text data may be deleted to conserve storage space automatically.

Currently there are services installed in select mobile devices that will track proximity of different mobile devices. The proximity monitoring services may be designed to detect the sound wave. Recording of sound is not necessary to detect sound wave. As known in the art, a sensor can detect the sound wave by tracking the vibration, and recording is not required to detect sound. Therefore, existing services installed in the phone devices may detect the proximity of mobile device and detect sound within a human spoken-word frequency range. In this case, the recording of the voice or spoken word of members of the participating team may be enabled. In this case, the recording of the sound will be done and the audible spoken content may be recorded and converted to text. It is noted that noise reductions are also known in the art. As known, the spoken words will start and stop the recording when the service detects the human voice in the relevant surroundings. Thus, continuous audio recording is not required.

FIG. 7 illustrates a dashboard arrangement showing the e-mail notification system according to an embodiment of the present invention. With reference to FIG. 7, the present invention provides a dashboard or similar member notification display or system 700 to notify the member or otherwise categorize the different message 710 in the members messaging system. In accordance with the invention, even though a user or member has not opened the email communication, which in the example of FIG. 6 relates to a "work from home policy", a dashboard icon 720 will indicate whether the member has listened to the content. For example, the dashboard 700 may notify or otherwise indicate that the member has listen to the content of a specific e-mail completely, so there is no need to read the email. In other instances, the notification system or icon 725 indicates that the member has listened to the content of a specific e-mail in part or not at all. As shown in FIG. 7, the flag 730 indicates a degree or percentage of content that each member has already listened to during a separate meeting or break; e.g., the break illustrated in FIG. 6.

To achieve this result, the system will gather data from different sources. In one example, a mobile device of a member of the participating team will gather the spoken communication for a relevant group of participating members and, after the appropriate text conversion, will compare unread contents of various e-mails to the converted text file. Based on the comparison, the system 100 will identify the degree of content coverage. The system may also obtain content of a spoken communication from a conference call attended by one or more of the participating team members whereby the conference call may be recorded then, after the appropriate text conversion, the system will compare unread contents of various e-mails to the converted conference call text file. Based on the comparison, the system 100 will identify the degree of content coverage of various email correspondence with the content of the conference call.

As shown in FIG. 7, an appropriate dashboard icon may be shown along with related communication contents. In this way, a member may be able to sort and compile read and unread content in an efficient manner.

FIG. 8 illustrates a dashboard providing an exemplary arrangement for identifying group member of a participating team and relevant discussions held by the group members. In addition to the icons illustrate in FIG. 7, the dashboard 800 of FIG. 8 illustrates a "Read Status" 810 of various email messages for a participating member including a percentage of the email content that was covered by a related discussion held by members of the participating team; e.g., status 815 indicates that 70% of a particular email content was covered in a related discussion with other participating team members. At 820, the dashboard may further provide a pull-down or other capability to show the members (e.g. Rudra, Santanu, Diptman in FIG. 8) of the participating team who were present during the discussion as well as the date and specific unread context (e.g., page 3/10, page 6/10 and page 8/10 in FIG. 8) that was determined after comparing the spoken content with the email content.

Additionally, the system 100 may provide recommendations to a member to join in a group during the break because many of the member's unread topics might be covered in the discussion. Further, the system 100 may not only indicate the content of email that remains unread, but the system 100 may likewise provide details of the recorded and converted oral communication that has not been read by the team member. Therefore, in the event that the oral discussion included more information than the written, email content, this system 100 will provide that additional content for the team member for review and analysis.

FIGS. 5, 7 and 8 illustrate various dashboard arrangements for identifying group members of a participating team and date/time of relevant discussions held by the group members, as well as how the relevant files may be updated in the folder explorer with an appropriate read status. When a participating team receives a set of documents and the participating team reads the those documents, then a mobile device may track: (1) what content was discussed at relevant meetings or discussion groups; (2) who were the participants of any discussion (e.g., using for example, mobile device proximity sensing), (3) time/date of discussion which, accordingly, can be added as metadata of each document, etc. Upon selecting any document from the list of FIG. 8, a member is able to get detail information about a discussion as well as the unread pages of the related e-mail.

Another example of the methods and procedures of the present invention will now be described. Member A arrives at the office and member A checks for email messages and, after one (1) hour, member A takes a break for 20 minutes. By that time, member A has read 50% of new mails but 25% of important email messages remain unread. Out of the 25% (important email), some may require action to be taken by member A (attention immediately required) and other are candidates for group discussion. As soon as member A's mobile location is a predetermined distance from member A's computer for more than, for example, 10 minutes, a notification is provided regarding pending actions that needs to be completed urgently. Based on mail list for the participating group, the computer system 100 creates an internal list of topics that remain unread and may be discussed as part of group discussion. Similar lists are prepared for all members of the participating team of members.

In accordance with this invention, the system 100 will have already stored data related to the participating team; for example, the group may consist of a team of architects, sales persons, managers, engineers, etc., or the participating group may be derived from members whom member A typically joins on break. Additionally, the participating members may be detected dynamically, for example, by detecting, via proximity sensors or other means, other members that member A met in the lobby. For every such person, mobile locations are known by the system 100 and the mail system has notified the member's mobiles about the unread topics. This detection and notification methodology provides a mechanism to identify members of a participating group who are assembled at a specific point in time. There, the system can identify common topics for discussion by the participating team.

Now, the mobile system can start acting. The participating team or group, individually or as a group, may notify each other and the system about potential unread topics that the participating group can discuss. With static or dynamic group participation, once a topic is discussed, the message may be marked as read for all in the same group. The notification and updating function can be done by checking a checkbox as marked as read or automatically. The enterprise communication server or group management engine 108 (see FIG. 3) may monitor and record the reading status of each and every message and recipient related to any communication. For example, member X has spent sufficient time to read content of massage 1. Member Y has opened the communication but has not read the same, and member Z has scrolled through the page.

Based on expected reading speed of the content, the enterprise communication server 108 will identify who has read any content in detail. The communication system can be self-taught with personalized reading speed and accordingly will understand who has read entire communication content or just looked at the summary etc. Using cognitive method software installed in user's device (e.g. a laptop, mobile phone, etc.), the system 100 will predict possible break time of any user considering following parameters: (1) historical break time; e.g. tea break at 10 am then 12:00 O'clock; (2) pattern of activity; e.g. completion of any meeting at 12:30 pm before starting any meeting etc.; (3) historical association of other users and their availability; e.g., members A, B, C, D often take breaks together; and (4) identification of logical completion of one or more activity.

The communication server and the devices of each and every user will identify: (a) who has read particular common content in the identified group, so each member might have knowledge to explain to the group; (b) the knowledge level of the user; e.g., who has read the content completely (c) who are the other users have not read the same content.

Software will historically compare the read out content of any member and then will validate how the same content is explained by the member. The degree of deviation will be used for calculating level of articulation of any member.

FIG. 9 is a data table or dashboard illustrating some features of the notification process in accordance with an embodiment of the present invention. With reference to FIG. 9, another example of the present invention will be explained. Member X's device has predicted that User X, A, B, C, D, E & F are planning for a break together, where member X and member C have read a "work from home" policy memo in a detailed manner. So, the policy memo can be considered as topic of discussion for the group, so that even though members A, B, D. E. F have not read the memo, the members will learn the detail of the email message during an oral conversation during the mentioned break with members X and C who have read the memo (see column 1 of FIG. 9). Likewise the memo on "Company Policy" have been read by members B, C, D and E but only scrolled through by members X and F.

During the break-time discussion, a mobile device of any member will gather the spoken contents and accordingly will perform contextual analysis of the spoken content to find if the spoken content is related to the one or more unread content of a relevant email received by any member of the participating team.

A mobile device will send the spoken content related to the unread contents to communication server or group management engine 108 (FIG. 3), the communication server 108 will identify the content coverage. The content coverage is basically how much content of the unread content is covered by the spoken contents, accordingly appropriate dashboard icons will be identified, for example summary is covered, contextual meaning is covered, only 30% content is covered etc.

The communication system will augment the unread contents with appropriate dashboard icons.

There will be a rule defined in the communication server 108 to identify the content coverage and associated dashboard icon.

If any user is having many unread contents, then the communication server 108 will search the knowledgebase to find who read those unread contents, and then will identify the possible group and the break time for the recommendation. If the topic of discussion is different than that of predicted discussion topic, then user might be alerted about the unread content and discuss the content during the break time.

Figure 10:
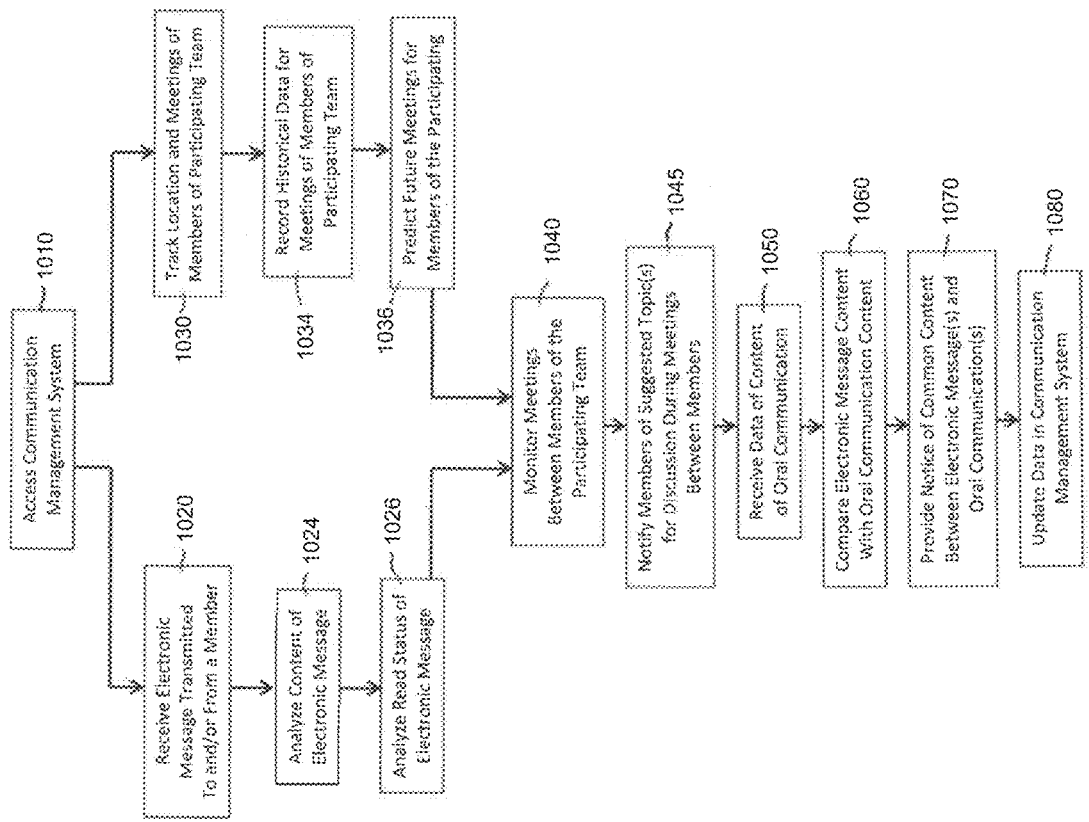
FIG. 10 is a flowchart showing the step of communication content management according to an embodiment of the present invention.

FIG. 10 is a flowchart showing the step of communication content management according to an embodiment of the present invention. First, the members of the participating team at step 1010 will access the communication management system such as system 100 of FIG. 3. The access step may include a log-in procedure or other type of initiation process to identify the members of the participating team that are being monitored by the system 100 and to begin the monitoring process. The system 100 will then begin to receive and evaluate electronic messages transmitted to and received from the members of the participating team at step 1020. As described above with respect to FIG. 3, the electronic messages are delivered between the message exchange server 102 and the group management engine 108. At step 1024, the group management engine 108 will proceed to analyze the content of the electronic message which may include OCR conversion and textual analysis to identify key words as well as linking various content of the electronic messages to and from the members of the participating team. At step 1026, the system 100 will analyze the read status of the various messages for each member of the participating team. The read status will indicate whether a particular message has been read, to what extent the message has been read, and the comprehension level assessed to each read or partially read message. Of course, the system 100 will also identify unread messages for each member.

At the same time, the system 100 will be tracking the location and meetings (e.g., informal breaks, scheduled meetings, conference calls, etc.) of each member of the participating team at step 1030, and the system at step 1034 will be recording historical data related to meetings and interactions of members of the participating team. At step 1036, the system 100 will predict future meetings of the members based on the recorded historical data (e.g., members A, B, and C typically meeting for coffee at 10:00 am).

Next, the system 100 at step 1040 will begin to monitor predicted and actual meetings between the various members of the participating team. When a meeting is predicted to occur or is actually occurring, the system at step 1045 will send suggested topics of discussion to the members based on the data collected related to the read status of the various electronic message received by the members. For example, the system 100 may determine that members X, Y and Z are meeting for coffee and all three members have received the same email regarding a work at home policy instituted by their employer. The system 100 may also determine that only member X has read the electronic message. In this case, the system will suggest that member X discuss the content of the electronic message with members Y and Z.

Next, the system 100 at step 1050 will receive data related to the content of oral communications between the members of the participating team. The system 100 will converts the oral communications, whether received from a microphone on a mobile device carried by the members, via a telephone conferences or other electronic reception of oral communications, into text that can likewise be analyzed for content. At step 1060, the content of the electronic messages will then be compared to the content of the oral communications to identify common content and overlap between the subjects being discussed in the oral communications and the subjects being mentioned in the electronic messages. In accordance with this invention, the system 100 will then at step 1070 provide suitable notice to the various members of the participating team regarding common content between the oral communications and the electronic messages. Lastly, the data in the communication management system 100 will be updated at step 1080 to reflect the current status of the various electronic messages for each member of the participating team.

As described above, if any member of the participating team has unread email messages then topics for discussion with other members may be suggested or the member might be recommended to join in a group where there is a chance of discussing one or more unread content of the unread email. Various parameters are considered to recommend a topic for discussion during a meeting or a group to be joined to clear unread email messages and related documents. As a result, the content of an unread email may be discussed in person with other recipients. In this case, the invention will be able to review and reconcile the content of unread email with the content of related breaks, meetings, conference calls and discussions.

Further according to the invention, formal and informal discussion content is captured from various participating users and accordingly based on contextual analysis of the discussion content, unread email contents such documents will be mapped. The discussion contents can be in different languages and software aggregate the gathered data and will translate the same with the common language as mentioned in the communication and identifying if any unread email is covered during the discussion.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that while this disclosure may be incorporated into a cloud computing environment, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
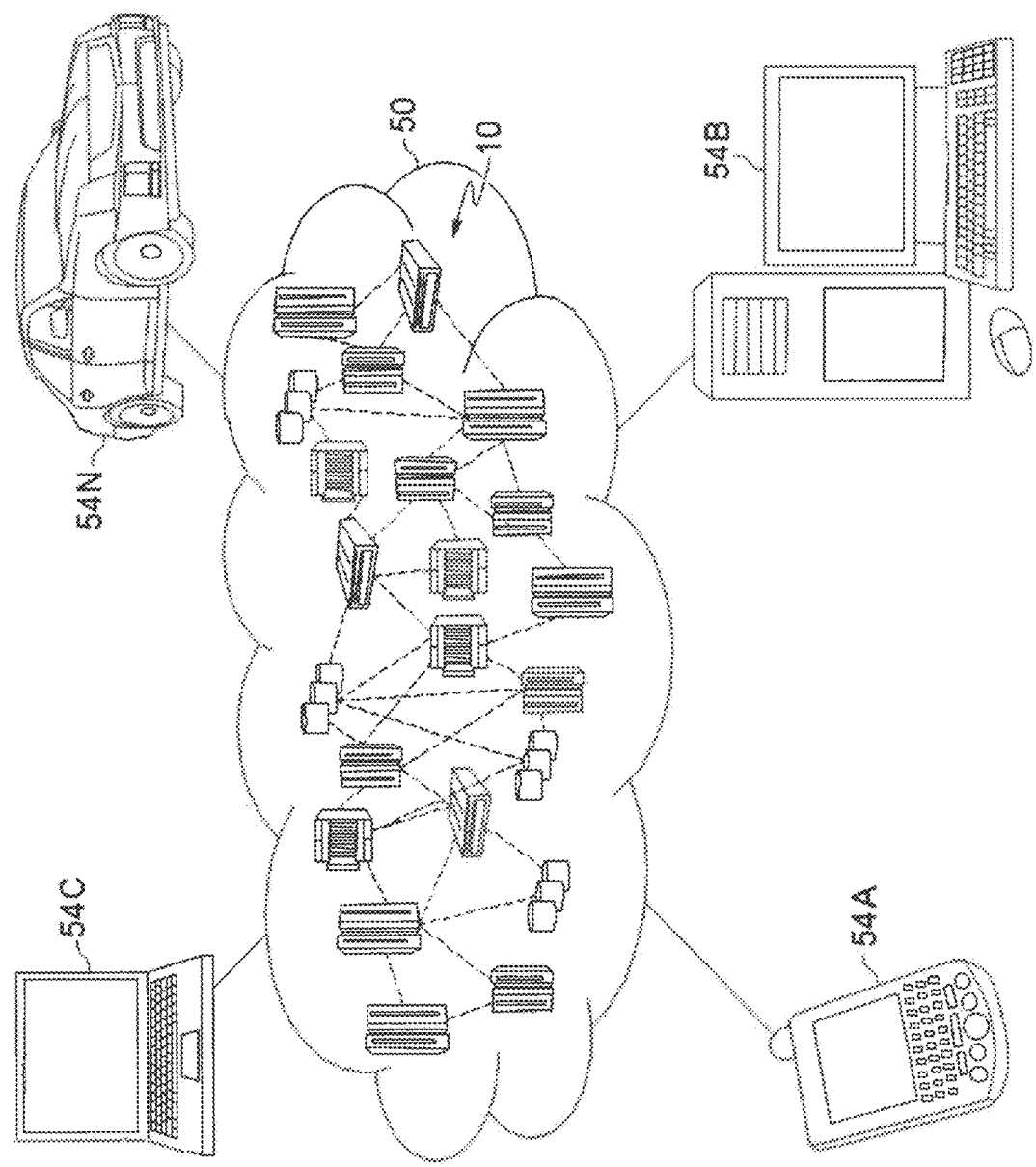
FIG. 11 depicts a cloud computing environment according to an embodiment of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. The nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
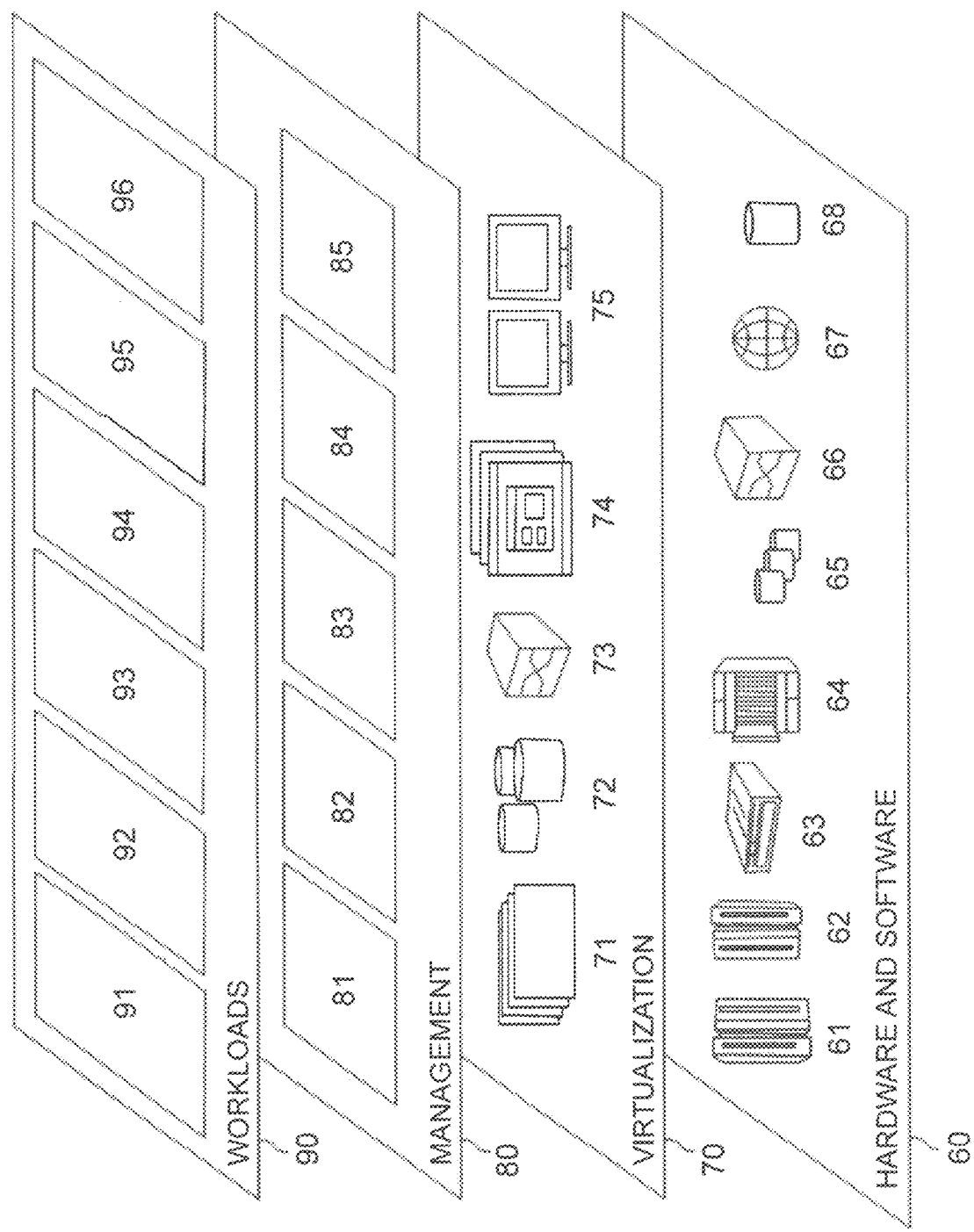
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment.

Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the electronic messaging system 96 which is equivalent to the electronic messaging system 100 of FIG. 3.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method of dynamically changing a read status of an electronic message, comprising the steps of:
    accessing, by a computer with a display device, a communication management system managing electronic messages among members of a participating team;
    reviewing, by the computer, at least one electronic message transmitted to a member of said participating team;
    analyzing, by the computer, a read status of said at least one electronic message of said member to identify an unread electronic message;
    analyzing, by the computer, first content of said at least one electronic message;
    tracking, by the computer, a location of said member of said participating team;
    identifying, by the computer, a meeting between said members of said participating team based on said location;
    receiving, by the computer, data related to second content of an oral communication between said members of said participating team during said meeting;
    comparing, by the computer, said first content of said electronic message with said data related to said second content of said oral communication;
    updating, by the computer, said read status in response to said members of said participating team discussing content of said unread electronic message during said meeting;
    displaying said updated read status on said display device; and
    providing notice, by the computer, to said member, said notice including an evaluation of common content between said first content of said electronic message with said data related to said second content of said oral communication;
    wherein said step of analyzing said first content includes performing optical character recognition on said electronic message to obtain first extracted terms;
    wherein said step of receiving said data related to said second content includes converting spoken word to text then performing character recognition of said text to obtain second extracted terms; and
    wherein said step of comparing includes comparing said first and second extracted terms.

2. The method of claim 1, further comprising: providing a dashboard including analysis of results of said step of comparing said first content of said electronic message with said data related to said second content of said oral communication.

3. The method of claim 1, wherein said step of receiving said data related to said second content includes converting spoken word to text then performing character recognition of said text to obtain extracted terms.

4. The method of claim 1, wherein said data related to said second content is received via a mobile device carried by at least one member of said participating team.

5. The method of claim 1, wherein said notice includes a percentage of common content between said first content and said second content.

6. The method of claim 1, further comprising:
    providing notice to said members of said participating team of at least one suggested topic for discussion during a meeting between said members of said participating team based on said step of analyzing said read status, wherein said members of said participating team may discuss content of said unread electronic message during said meeting.

7. The method of claim 1, wherein said step of tracking said location of said member includes recording historical data of past meeting locations of said member with other members of said participating team.

8. The method of claim 1, further comprising:
    predicting at least one of a time and a location of a future meeting between members of said participating team based on said historical data of past meeting locations.

9. The method of claim 1, further comprising:
    determining the identity of members of said participating team by analyzing historical data of meetings between persons in communication with said communication management system.

10. The method of claim 1, further comprising
notifying at least one absent member of said participating team that other members of said participating team are discussing a topic of interest to said at least one absent member.

11. A computer program product comprising: a computer-readable storage medium; and a computer-readable program code stored in the computer-readable storage device, the computer readable program code containing instructions executable by a processor of a computer system to implement a method of dynamically changing a read status of an electronic message, the method comprising: accessing a communication management system managing electronic messages among members of a participating team; reviewing at least one electronic message transmitted to a member of said participating team; analyzing a read status of said at least one electronic message of said member to identify an unread electronic message; analyzing first content of said at least one electronic message; tracking a location of said member of said participating team; identifying a meeting between said members of said participating team based on said location; receiving data related to second content of an oral communication between said members of said participating team during said meeting; comparing said first content of said electronic message with said data related to said second content of said oral communication; updating said read status in response to said members of said participating team discussing content of said unread electronic message during said meeting; and displaying said updated read status on a display device; and Ser. No. 15/651,6326 providing notice to said member, said notice including an evaluation of common content between said first content of said electronic message with said data related to said second content of said oral communication; wherein said step of analyzing said first content includes performing optical character recognition on said electronic message to obtain first extracted terms; wherein said step of receiving said data related to said second content includes converting spoken word to text then performing character recognition of said text to obtain second extracted terms; wherein said step of comparing includes comparing said first and second extracted terms.

12. The computer program product of claim 11, said method further comprising: providing a dashboard including analysis of results of said step of comparing said first content of said electronic message with said data related to said second content of said oral communication.

13. The computer program product of claim 11, said method further comprising:
providing notice to said members of said participating team of at least one suggested topic for discussion during a meeting between said members of said participating team based on said step of analyzing said read status, wherein said members of said participating team may discuss content of said unread electronic message during said meeting.

14. The computer program product of claim 11, wherein said step of tracking said location of said at least one member includes recording historical data of past meeting locations of said at least one member with other members of said participating team, said method further comprising:
predicting at least one of a time and a location of a future meeting between members of said participating team based on said historical data of past meeting locations.

15. A computer system, comprising:
a processor;
a memory coupled to said processor;
a display device; and
a computer readable storage device coupled to the processor, the storage device containing instructions executable by the processor via the memory to implement a method of dynamically changing a read status of an electronic message, the method comprising the steps of:
accessing a communication management system managing electronic messages among members of a participating team;
reviewing at least one electronic message transmitted to a member of said participating team;
analyzing a read status of said at least one electronic message of said member to identify an unread electronic message;
analyzing first content of said at least one electronic message;
tracking a location of said member of said participating team;
identifying a meeting between said members of said participating team based on said location;
receiving data related to second content of an oral communication between said members of said participating team during said meeting;
comparing said first content of said electronic message with said data related to said second content of said oral communication;
updating said read status in response to said members of said participating team discussing content of said unread electronic message during said meeting;
displaying said updated read status on said display device; and
providing notice to said member, said notice including an evaluation of common content between said first content of said electronic message with said data related to said second content of said oral communication;
wherein said step of analyzing said first content includes performing optical character recognition on said electronic message to obtain first extracted terms;
wherein said step of receiving said data related to said second content includes converting spoken word to text then performing character recognition of said text to obtain second extracted terms;
wherein said step of comparing includes comparing said first and second extracted terms.

\* \* \* \* \*